(No Model.)
M. J. WALSH.
Coupling for Hydraulic Jacks.
No. 236,519. Patented Jan. 11, 1881.
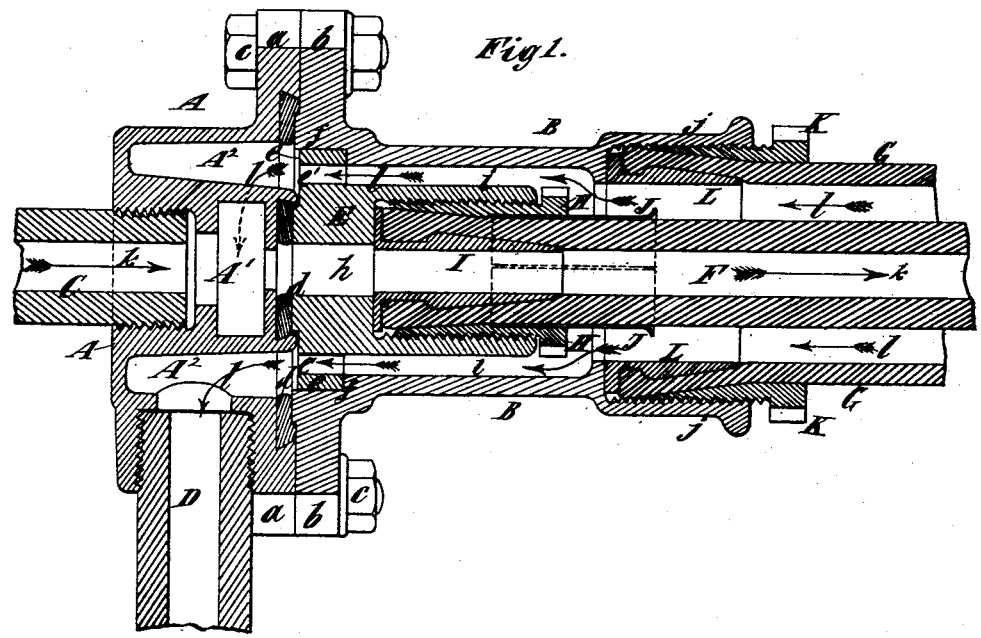
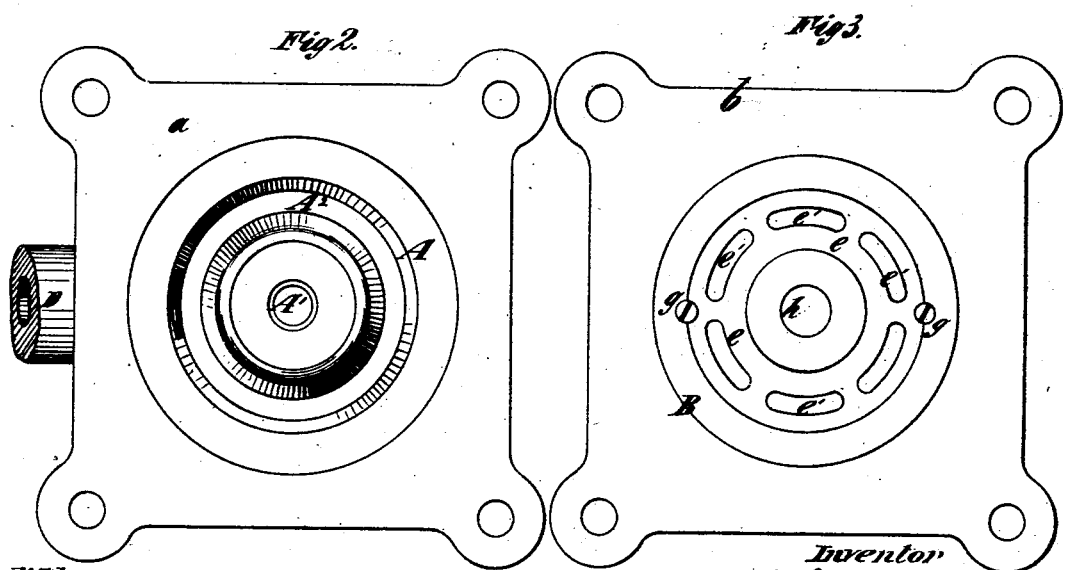
Witnesses
John Becker
E. P. Jessup
Inventor
M. J. Walsh,
by his Attorneys
Bennet & Brown

UNITED STATES PATENT OFFICE.

MAURICE J. WALSH, OF NEW YORK, N. Y.

COUPLING FOR HYDRAULIC JACKS.

SPECIFICATION forming part of Letters Patent No. 236,519, dated January 11, 1881.

Application filed April 21, 1880. (No model.)

*To all whom it may concern:*

Be it known that I, MAURICE J. WALSH, of the city of New York, in the county and State of New York, have invented certain new and useful Improvements in Couplings for Hydraulic Jacks, of which the following is a specification.

In the operation of hydraulic jacks for stowing cotton in vessels a line supply and a line exhaust pipe are extended along the dock, and each jack is connected with such line-pipes by means of flexible branch supply and exhaust pipes, the supply-pipe being preferably arranged inside the exhaust-pipe.

My invention relates to couplings for connecting the branch supply and exhaust pipes with the main line supply and exhaust pipe; and it consists in various details of construction and combinations of parts, whereby an effective and desirable coupling for this purpose is produced.

In the accompanying drawings, Figure 1 represents a longitudinal section through a coupling embodying my improvements, and Figs. 2 and 3 represent face views of the two portions or sections of my coupling.

Similar letters of reference designate corresponding parts in the several figures.

A B designate the two parts or sections of which my coupling is composed, here represented as provided with flanges $a$ $b$, through which pass bolts $c$, for securing the two said parts or sections together. A packing, $d$, of soft metal or other suitable material, is represented as arranged between the meeting faces of the two parts or sections, so as to maintain a tight joint between them.

To the part or section A is connected a pipe, C, establishing communication with the line supply-pipe, from which water may flow through a central opening, A', in the part or section A, and D is a pipe for establishing communication between the line exhaust-pipe and an annular chamber, $A^2$, in the part or section A.

E designates a central hub fitting within the part or section B, and detachably secured thereto by means of a flange, $e$, which fits in a recess, $f$, in the part or section B, and is secured against turning by plugs or screws $g$, fitted half in the flange and half in the side of the recess, as represented clearly in Fig. 3.

The hub E has a central opening, $h$, extending through it, and in its flange $e$ are openings $e'$, which afford a free circulation of water around said hub toward the annular chamber $A^2$ in the part or section A.

To the end of the hub E is connected the branch hose F, for supplying a jack with water, and to the part or section B is connected the branch hose G, through which the exhaust returns from said jack.

In order to make a tight joint between the hub E and the branch supply-hose F, I provide the said hub with an internally screw-threaded socket, $i$; and H designates an externally screw-threaded sleeve, which surrounds the hose and is fitted to the screw-threaded socket $i$.

I designates a thimble or bush having a taper exterior fitting within the hose, and as the sleeve H is screwed into the socket $i$ the hose is compressed between the sleeve and the taper exterior of the thimble or bush, and a secure joint is thus formed. As considerable wear comes upon the supply-hose F where it protrudes from the sleeve H, the hose is liable to become cut or broken at that point, and to obviate this I surround the hose with a sleeve or jack, J, of sheet metal, preferably steel, which projects beyond the end of the sleeve, and which protects the hose and prevents cutting or abrasion.

The hose G is secured in the same manner as the hose F, the part or section B having an internally screw-threaded socket, $j$, and a sleeve, K, and thimble or bush L, in all respects like the sleeve H and thimble I, are employed.

The water-supply entering through the pipe C passes directly through the coupling in the direction of the arrows $k$, and through the branch supply-hose F, leading to the jack. From the jack the exhaust-water returns through the hose G around the outside of the hub E, through the openings $e'$, to the annular chamber $A^2$, and thence through the pipe D, to the line exhaust-pipe, as clearly shown by the arrows $l$.

What I claim as my invention, and desire to secure by Letters Patent, is—

1. The combination of the part or section B, the hub E, arranged therein and provided with an opening extending through it, and the exhaust and supply pipes G F, secured respectively to the part or section B and the hub E, and arranged one within the other, substantially as specified.

2. The combination of the hub E, having an opening through it, provided with a screw-threaded socket, $i$, the hose F, sleeve H, and thimble I, for securing said hose in said socket, and the part or section B, provided with a screw-threaded socket, $j$, the hose G, and the sleeve K and thimble L, for securing said hose in said socket, substantially as specified.

3. The combination, with the part or section A, having the central opening, A', and the annular chamber $A^2$, of the part or section B, having connected to it the exhaust-pipe G, and the central hub, E, having connected to it the supply-pipe F, and having openings $e'$ for the passage of water, substantially as specified.

4. The combination, with the hub E, the hose F, and sleeve H, of the jacket J, surrounding said hose and projecting beyond the end of the sleeve H, substantially as and for the purpose specified.

MAURICE J. WALSH.

Witnesses:
WM. J. REID,
R. VAN VOLKENBERGH.